United States Patent
Li et al.

(10) Patent No.: US 9,746,685 B2
(45) Date of Patent: Aug. 29, 2017

(54) DISPLAY DEVICE

(71) Applicants: Shanghai Tianma Micro-electronics Co., Ltd., Shanghai (CN); Tianma Micro-electronics Co., Ltd., Shenzhen (CN)

(72) Inventors: Jialing Li, Shanghai (CN); Lei Niu, Shanghai (CN); Jun Ma, Shanghai (CN)

(73) Assignees: SHANGHAI TIANMA MICRO-ELECTRONICS CO., LTD, Shanghai (CN); TIANMA MICRO ELECTRONICS CO., LTD., Shenzhen (CN)

( * ) Notice: Subject to any disclaimer, the term of this patent is extended or adjusted under 35 U.S.C. 154(b) by 3 days.

(21) Appl. No.: 15/014,717

(22) Filed: Feb. 3, 2016

(65) Prior Publication Data

US 2017/0108700 A1 Apr. 20, 2017

(30) Foreign Application Priority Data

Oct. 15, 2015 (CN) .......................... 2015 1 0666611

(51) Int. Cl.
*G02B 27/22* (2006.01)
*G02B 3/00* (2006.01)
*H04N 13/04* (2006.01)

(52) U.S. Cl.
CPC ....... *G02B 27/2214* (2013.01); *G02B 3/0056* (2013.01); *G02B 27/22* (2013.01); *H04N 13/0404* (2013.01); *H04N 2213/005* (2013.01)

(58) Field of Classification Search
CPC ........... H04N 13/0404; H04N 13/0406; G02B 27/22; G02B 27/2214

USPC .......................................................... 359/463
See application file for complete search history.

(56) References Cited

U.S. PATENT DOCUMENTS

| | | | |
|---|---|---|---|
| 5,712,731 A | 1/1998 | Drinkwater et al. | |
| 5,936,607 A * | 8/1999 | Allio | G02B 27/2214 313/371 |
| 5,956,001 A * | 9/1999 | Sumida | G02B 27/2214 345/55 |
| 9,101,279 B2 * | 8/2015 | Ritchey | G05D 1/0038 |
| 2004/0239231 A1 * | 12/2004 | Miyagawa | G02B 27/2214 313/438 |
| 2005/0083319 A1 * | 4/2005 | Kodate | G09G 3/3659 345/204 |
| 2006/0098033 A1 * | 5/2006 | Langendijk | G02B 5/201 345/694 |

(Continued)

FOREIGN PATENT DOCUMENTS

| | | |
|---|---|---|
| CN | 101335050 A | 12/2008 |
| CN | 103123430 A | 5/2013 |
| CN | 103236222 A | 8/2013 |

*Primary Examiner* — William R Alexander
(74) *Attorney, Agent, or Firm* — Anova Law Group, PLLC

(57) ABSTRACT

A display device is provided. The display device includes a display panel including a plurality of display units displaying a same image, and a microlens array including a plurality of microlens elements disposed on top of a light emitting surface of the display panel. The plurality of microlens elements are one-to-one corresponding to the plurality of display units, and a distance between a center of the microlens element and a center of the corresponding display unit gradually increases from a center of the display panel to an edge of the display panel.

20 Claims, 13 Drawing Sheets

(56) References Cited

U.S. PATENT DOCUMENTS

| | | | |
|---|---|---|---|
| 2010/0033813 A1* | 2/2010 | Rogoff | G02B 27/2214 359/463 |
| 2011/0164036 A1* | 7/2011 | De Zwart | G02B 27/2214 345/419 |
| 2011/0255170 A1* | 10/2011 | Yamada | G02B 5/0236 359/619 |
| 2013/0037698 A1* | 2/2013 | Maeda | H01L 27/14627 250/208.1 |
| 2014/0218327 A1* | 8/2014 | Shi | G06F 3/041 345/174 |
| 2015/0109269 A1 | 4/2015 | Sung et al. | |
| 2015/0325180 A1* | 11/2015 | Silva | G09G 3/3433 345/690 |
| 2016/0358551 A1* | 12/2016 | Nagayama | G09G 3/20 |

\* cited by examiner

DISPLAY DEVICE

CROSS-REFERENCES TO RELATED APPLICATIONS

This application claims the priority of Chinese patent application No. CN201510666611.4, filed on Oct. 15, 2015, the entire content of which is incorporated herein by reference.

FIELD OF THE DISCLOSURE

The present disclosure relates to the field of display technology and, more particularly, relates to a display device with improved viewing angle and viewing experience.

BACKGROUND

Display technology is developing along the direction towards high-definition and three-dimensional (3D) display. Different from a traditional two-dimensional (2D) display, a 3D display utilizes various approaches to introduce a depth perception to viewers, which enables the viewers to naturally or unnaturally obtain 3D information.

As technology develops and people's living standard improves, viewers often do not satisfy with display devices simply delivering 2D images, rather hope for display devices desired for displaying more vivid 3D images which are closer to human visual perception.

Conventional 3D display device is usually based a binocular parallax principle, in which a left view for a left eye and a right view for a right eye are separated by a lens or a grating and then received by the viewer's left eye and right eye, respectively. The viewer's brain fuses the left view and the right view to generate a visual perception of 3D display.

FIG. 1 illustrates a schematic of a conventional three-dimensional (3D) display. As shown in FIG. 1, the conventional 3D display usually provides limited viewing points, i.e., limited 3D viewing zones. The viewer can only observe 3D images at V1 zone, V2 zone, V3 zone and V4 zone. Thus, the conventional 3D display device can only provide separated viewing zones and limited viewing points, which causes symptoms like headaches, nausea and etc., if the viewer watch the conventional 3D display for a long time.

Further, the 3D image performance degrades when the conventional 3D display is watched at off-angles. The 3D images displayed by the conventional 3D display cannot change along with a movement of the viewer's eyes. That is, 3D images corresponding to different viewing angles cannot be generated. Thus, the conventional 3D display is not able to provide the viewer an immersive 3D experience and the displayed images are not intuitive.

The disclosed display device is directed to solve one or more problems in the art.

BRIEF SUMMARY OF THE DISCLOSURE

One aspect of the present disclosure provides a display device. The display device includes a display panel including a plurality of display units displaying a same image, and a microlens array including a plurality of microlens elements disposed on top of a light emitting surface of the display panel. The plurality of microlens elements are one-to-one corresponding to the plurality of display units, and a distance between a center of the microlens element and a center of the corresponding display unit gradually increases from a center of the display panel to an edge of the display panel.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the invention, which are illustrated in the accompanying drawings. Hereinafter, embodiments consistent with the disclosure will be described with reference to drawings. Wherever possible, the same reference numbers will be used throughout the drawings to refer to the same or like parts. It is apparent that the described embodiments are some but not all of the embodiments of the present invention. Based on the disclosed embodiments, persons of ordinary skill in the art may derive other embodiments consistent with the present disclosure, all of which are within the scope of the present invention.

The present disclosure provides a display device. The display device includes a display panel including a plurality of display units displaying a same image, and a microlens array including a plurality of microlens elements disposed on top of a light emitting surface of the display panel. The plurality of microlens elements are one-to-one corresponding to the plurality of display units, and a distance between a center of the microlens element and a center of the corresponding display unit gradually increases from a center of the display panel to an edge of the display panel. The display devices may realize floating images and widen viewing angles, thus improve the viewing experience.

The display devices consistent with disclosed embodiments are described in details with schematics. The schematics of the display devices may be partially enlarged, which is only for illustrative purposes and is not intended to limit the scope of the present invention. In a practical manufacturing, the schematics of the display devices may further include spatial dimensions of the display devices, such as length, width and height.

Figure 1:
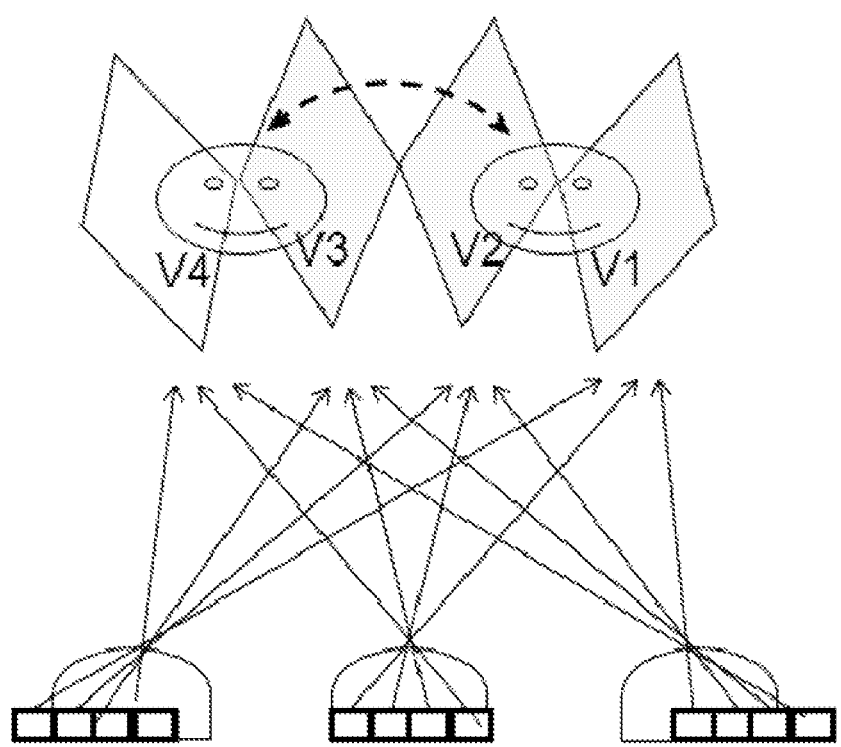
FIG. 1 illustrates a schematic of a conventional three-dimensional (3D) display.
Figure 2:
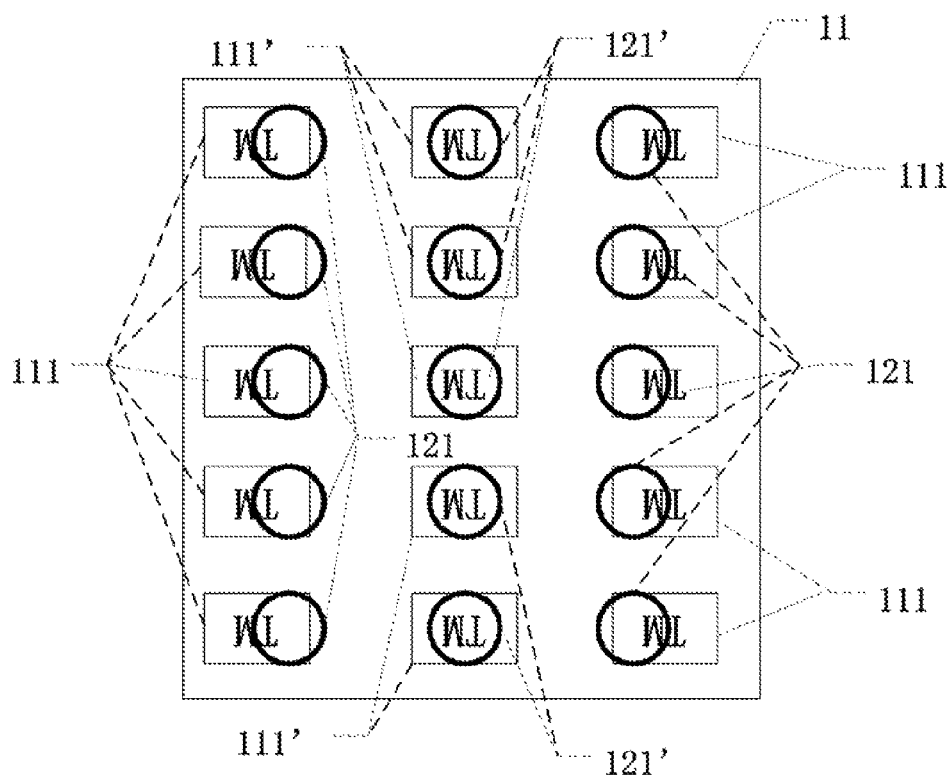
FIG. 2 illustrates a top view of an exemplary display device consistent with disclosed embodiments.

FIG. 2 illustrates a top view of an exemplary display device consistent with disclosed embodiments. As shown in FIG. 2, the display device may include a display panel 11 and a microlens array (not labeled). The display panel 11 may include a plurality of display units 111 each displaying an image. For illustrative purposes, each display unit 111 may be set to display a same image "TM" (two letters). The display unit 111 may be any appropriate unit of display for displaying an image or an image element. For example, the display unit 111 may be a pixel or a subpixel of an image, or the display unit 111 may be a block of pixels (e.g., an array of pixels) with a predetermined size for displaying a number of pixels of an image or an image element.

The microlens array may include a plurality of microlens elements 121 disposed on top of a light emitting surface of the display panel 11. The plurality of microlens elements 121 may be one-to-one corresponding to the plurality of display units 111. Each microlens element 121 may include at least one microlens. The microlens element 121 may be coupled to the corresponding display unit 111 by a bonding means, such as glue, etc.

Further, a distance between a center of the microlens element 121 and a center of the corresponding display unit 111 may gradually increase from a center of the display panel 11 to an edge of the display panel 11. That is, in each row, the center of the display unit 111' disposed at the center of the row may coincide with the center of the corresponding microlens element 121' disposed at the center of the row. Along the center of the display panel 11 to the edge of the display panel 11, the center of the display unit 111 may gradually deviate from the center of the corresponding microlens element 121. That is, the distance between the center of the microlens element 121 and the center of the corresponding display unit 111 may gradually increase.

In particular, the distance between the center of the microlens element 121 and the center of the corresponding display unit 111 may gradually increase until the display unit 111 and the microlens elements 121 are separated by a predetermined threshold distance. The threshold distance may be determined in advance based on the display units 111, the microlens elements 121, and/or the image displayed. For example, the maximum distance can be separated may be set such that the image displayed by the display unit 111 may not be able to be refracted by the corresponding microlens element 121. That is, the display unit 111 and the corresponding microlens element 121 are no longer overlapped.

It should be noted that, the plurality of the display units 111 may be arranged in a matrix, i.e., a display unit matrix. In a row direction of the display unit matrix, the distance between the center of the microlens element 121 and the center of the corresponding display unit 111 may gradually increase from the center of the display panel 11 to the edge of the display panel 11.

After being refracted by the corresponding microlens elements 121, the images displayed by the display units 111 may show different spatial angles of the image "TM", i.e., the images displayed by the display units 111 may include different portions of the image "TM". The different portions of the image "TM" may enter different viewing zones of the display panel 11. That is, each microlens element 121 may record a partial image displayed by the display unit 111 from a different direction. The images displayed by the display units 111 may be refracted by the corresponding microlens elements 121, and then fused into a 3D image floating in a space, which may look like a 3D image floating in the air.

For example, the 3D image may be fused or constructed based on an integral imaging principle. That is, the image "TM" displayed by the plurality of display units 111 may be refracted and integrated through the plurality of microlens elements 121 to be perceived as a 3D image. The constructed 3D image may be placed at an object space of a large convex lens which is called a floating lens. The floating lens may project the constructed 3D image to the space, and the projected 3D image may look like floating in the air, which may be also called as a floating image.

As shown in FIG. 2, in the row direction of the display unit matrix, from the center of the display panel 11 to the edge of the display panel 1, the distance between the center of the microlens element 121 and the center of the corresponding display unit 111 may gradually increase. When the viewer moves in the row direction of the display unit matrix, a relative position between the observed image and the display device may change along with the viewer's location.

Figure 3:
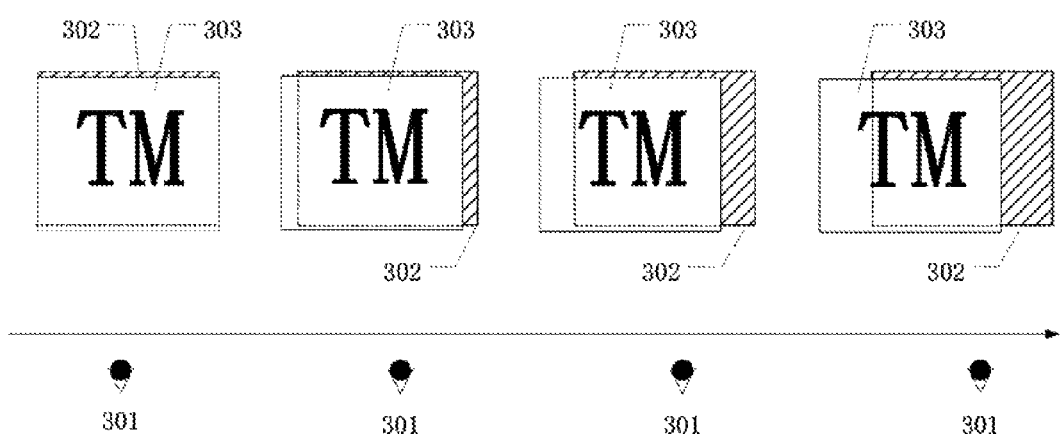
FIG. 3 illustrates images observed at different viewing positions in an exemplary display device in FIG. 2 consistent with disclosed embodiments.

FIG. 3 illustrates images observed at different viewing positions in an exemplary display device in FIG. 2 consistent with disclosed embodiments. As shown in FIG. 3, when a viewer has his/her eyes 301 exactly face a center of a display device 302, a floating image 303 may be displayed right in front of the display device 302.

When the viewer's eyes 301 move along a row direction (i.e. the direction of the arrow in FIG. 3), i.e., deviating from the center of the display device 302, a relative position between the floating image 303 and the display device 302 may change, revealing a right region of the display device 302. Similarly, when the viewer's eyes 301 move along an opposite direction of the arrow, the relative position between the floating image 303 and the display device 302 may also change, revealing a left region of the display device 302.

When the viewer's eyes move along the row direction, the relative position between the floating image 303 and the display device 302 may change, which may exhibit a similar effect as observing a real object when the viewer is in motion. Thus, the display device 302 may be able to display more realistic floating images. In addition, along with the movement of the viewer's eyes, the display device may display different floating images as viewed from different angles, which may be closer to the human visual perception in the real world and provide the viewer a fully immersive viewing experience.

Returning to FIG. 2, because of the one-to-one correspondence between the microlens element 121 and the display unit 111, each display unit 111 may display the same image. Through designing the relative positions between the microlens elements 121 and the corresponding display units 111, different portions of the image may be refracted by different microlens elements 121 and then combined into one floating image.

Compared with the conventional display device utilizing a lens or a grating to separate the image into a left view entering the viewer's left eye and a right view entering the viewer's right eye, the disclosed display device may enable the viewer to observe the floating image within a 360-degree coverage of the display device, which may significantly widen the viewing angle as well as enhance the viewing experience. The floating image may offer a possibility of interactive operation, either directly using fingers or via 3D positioning devices. The 360° viewing angle may enable a group of people working together to stand around the display.

In certain embodiments, the plurality of the display units may be arranged in a matrix, i.e., a display unit matrix. In a column direction of the display unit matrix, the distance between the center of the microlens element 121 and the center of the corresponding display unit 111 may gradually increase from the center of the display panel 11 to the edge of the display panel 11.

Figure 4:
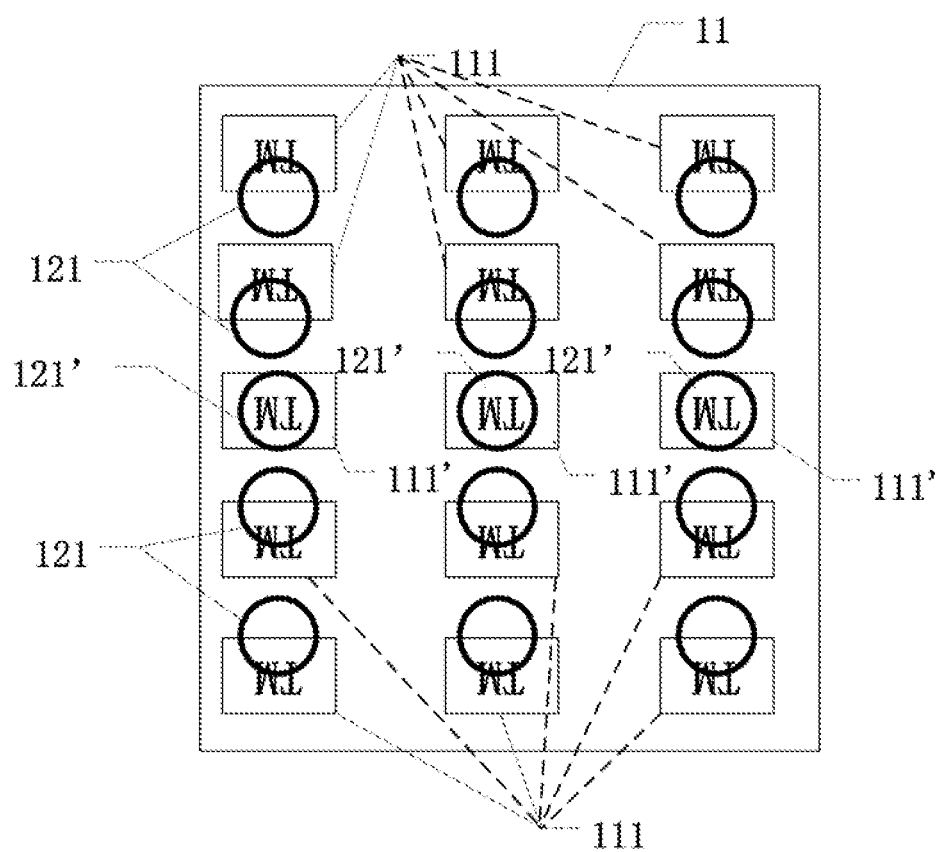
FIG. 4 illustrates a top view of another exemplary display device consistent with disclosed embodiments.

FIG. 4 illustrates a top view of another exemplary display device consistent with disclosed embodiments. As shown in FIG. 4, in each column, a center of a display unit 111' disposed at a center of the column may coincide with a center of the corresponding microlens element 121' disposed at the center of the column. Along a center of a display panel 11 to an edge of the display panel 11, the center of the display unit 111 may gradually deviate from the center of the corresponding microlens element 121. That is, the distance between the center of the microlens element 121 and the center of the corresponding display unit 111 may gradually increase.

In particular, the distance between the center of the microlens element 121 and the center of the corresponding display unit 111 may gradually increase until the display unit 111 and the microlens elements 121 are separated by a predetermined threshold distance. The threshold distance may be determined in advance based on the display units 111, the microlens elements 121, and/or the image displayed. For example, the maximum distance can be separated may be set such that the image displayed by the display unit 111 may not be able to be refracted by the corresponding microlens element 121. That is, the display unit 111 and the corresponding microlens element 121 are no longer overlapped.

Figure 5:
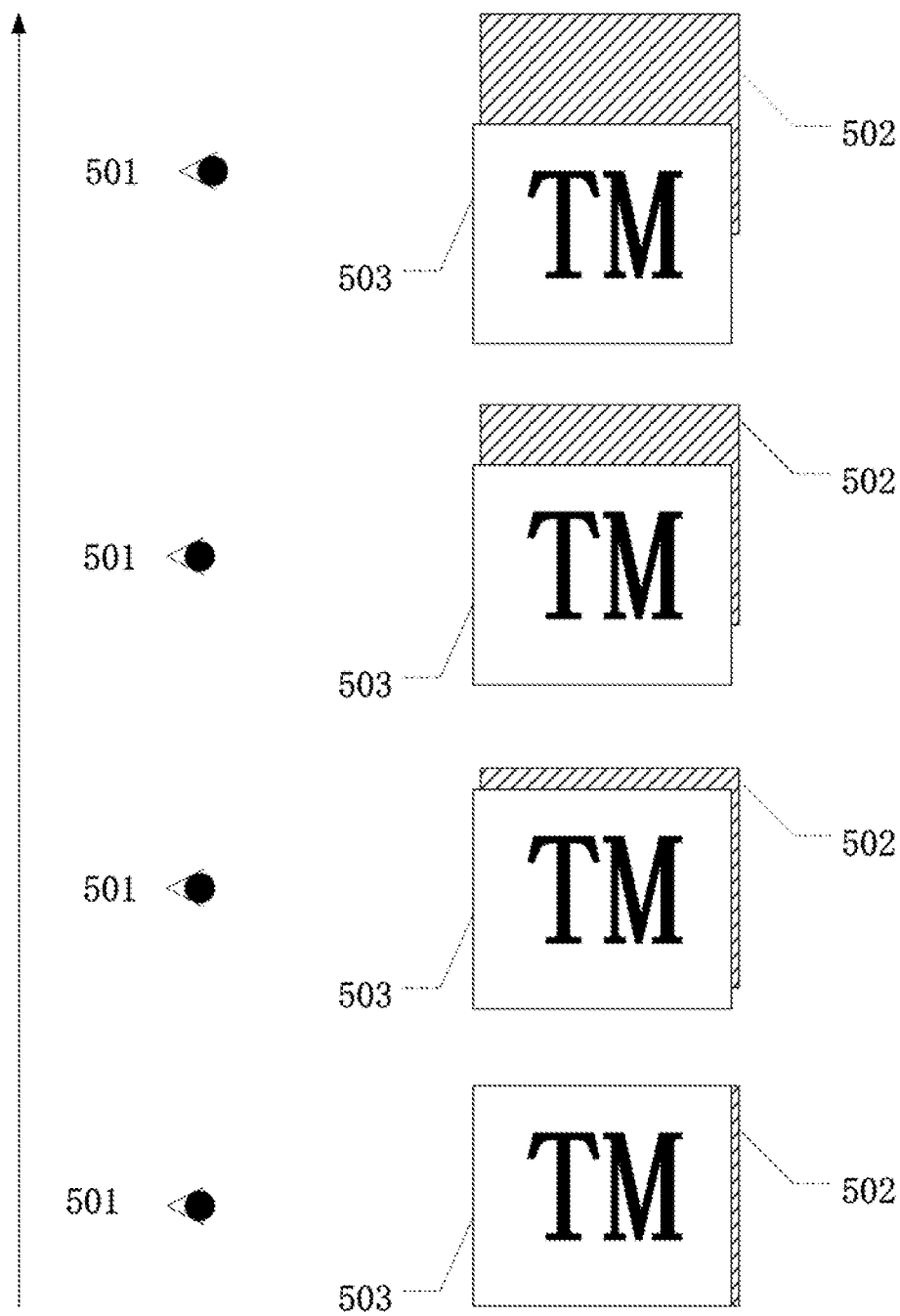
FIG. 5 illustrates images observed at different viewing positions in another exemplary display device in FIG. 4 consistent with disclosed embodiments.

FIG. 5 illustrates images observed at different viewing positions in another exemplary display device in FIG. 4 consistent with disclosed embodiments. As shown in FIG. 5, when a viewer has his/her eyes 501 exactly face a center of a display device 502, a floating image 503 may be displayed right in front of the display device 502.

When the viewer's eyes 501 move along a row direction (the direction of the arrow in FIG. 5), i.e., deviating from the center of the display device 502, a relative position between the floating image 503 and the display device 502 may change, revealing an upper region of the display device 502.

Similarly, when the viewer's eyes 501 move along an opposite direction of the arrow, the relative position between the floating image 503 and the display device 502 may also change, revealing a lower region of the display device 502. Thus, the display device may also be able to display more realistic floating images. In addition, along with the movement of the viewer's eyes, the display device may display different images as viewed from different angles, which may be closer to the human visual perception in the real world and provide the viewer a fully immersive viewing experience.

In certain embodiments, the plurality of the display units may be arranged in a matrix, i.e., a display unit matrix. In both a row direction of the display unit matrix and a column direction of the display unit matrix, the distance between the center of the microlens element 121 and the center of the corresponding display unit 111 may gradually increase from the center of the display panel 11 to the edge of the display panel 11.

Figure 6:
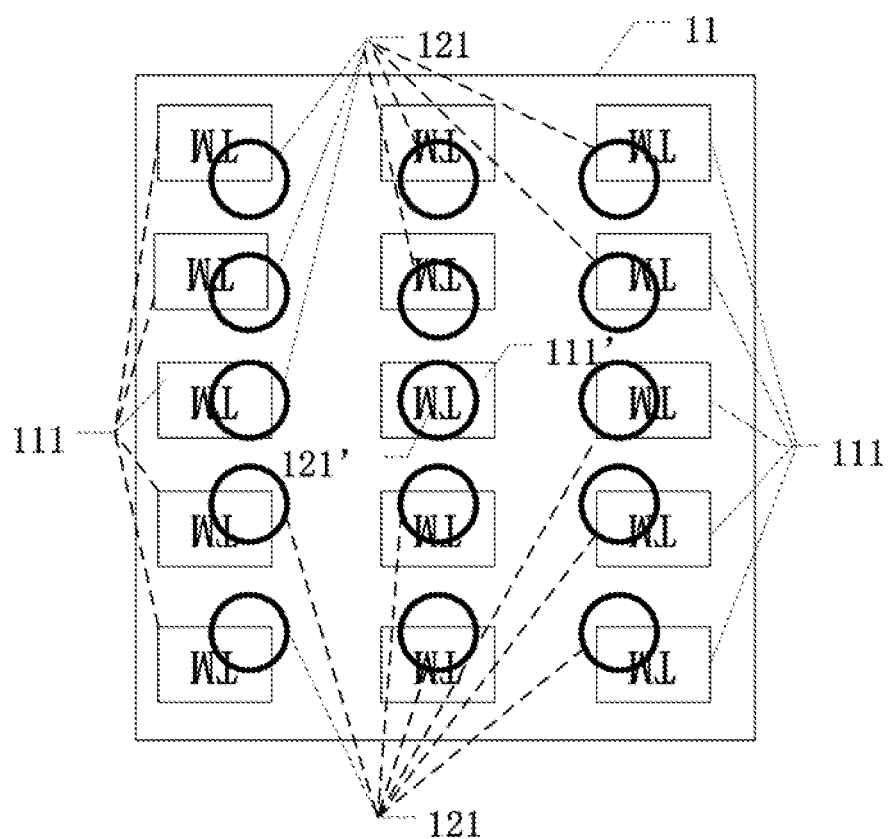
FIG. 6 illustrates a top view of another exemplary display device consistent with disclosed embodiments.

FIG. 6 illustrates a top view of another exemplary display device consistent with disclosed embodiments. As shown in FIG. 6, a center of a display unit 111' disposed at a center of a display panel 11 may coincide with a center of a microlens element 121' disposed at the center of the display panel 11. From the center of the display panel 11 to the edge of the display panel 11, the center of the display unit 111' may gradually deviate from the center of the corresponding microlens element 121'. That is, the distance between the center of the microlens element 121 and the center of the corresponding display unit 111 may gradually increase in both the row direction of the display unit matrix and the column direction of the display unit matrix (e.g., horizontal direction and vertical direction).

In particular, the distance between the center of the microlens element 121 and the center of the corresponding display unit 111 may gradually increase until the display unit 111 and the microlens elements 121 are separated by a predetermined threshold distance. The threshold distance may be determined in advance based on the display units 111, the microlens elements 121, and/or the image displayed. For example, the maximum distance can be separated may be set such that the image displayed by the display unit 111 may not be able to be refracted by the corresponding microlens element 121. That is, the display unit 111 and the corresponding microlens element 121 are no longer overlapped.

A floating image displayed by the display device may change its relative position to the display device, no matter the viewer's eyes move in the row direction of the display unit matrix or the column direction of the display unit matrix.

Figure 7:
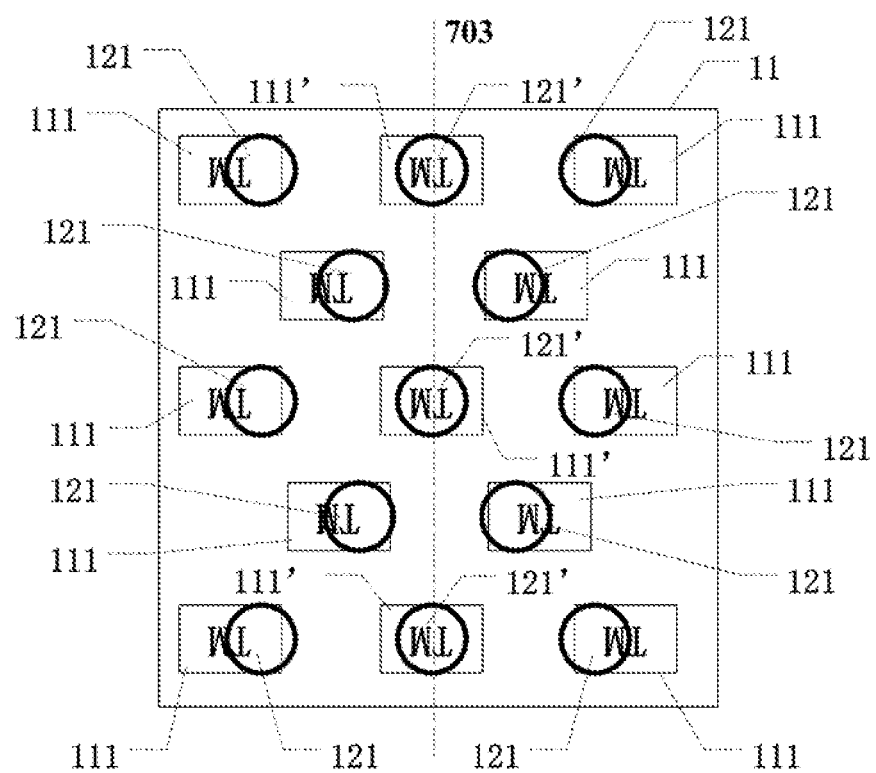
FIG. 7 illustrates a top view of another exemplary display device consistent with disclosed embodiments.

FIG. 7 illustrates a top view of another exemplary display device consistent with disclosed embodiments. As shown in FIG. 7, the display device may include a display panel 11 and a microlens array (not shown in FIG. 7). The display panel 11 may include a plurality of display units 111 each displaying an image. For illustrative purposes, each display unit 111 may be set to display a same image "TM" (two letters). The display unit 111 may be any appropriate unit of display for displaying an image or an image element. For example, the display unit 111 may be a pixel or a subpixel of an image, or the display unit 111 may be a block of pixels (e.g., an array of pixels) with a predetermined size for displaying a number of pixels of an image or an image element.

The microlens array including a plurality of microlens elements 121 may be disposed on top of a light emitting surface of the display panel 11. The plurality of microlens elements 121 may be one-to-one corresponding to the plurality of display units 111. Each microlens element 121 may include at least one microlens. The microlens element 121 may be coupled to the corresponding display unit 111 by a bonding means, such as glue, etc.

Further, the plurality of display units 111 may be arranged in multiple rows and multiple columns, and the display units 111 disposed in two adjacent rows may be staggered in the column direction. In the row direction, a center of the display unit 111' disposed along a vertical center line 703 of the display panel 11 may coincide with a center of the microlens element 121' disposed along the vertical center line 703 of the display panel 11. That is, for each row of the display units, those display units centered along the vertical center line 703 are display units 111', and the corresponding microlens element 121' are disposed on the display units 111' with coinciding centers.

Along the center of the display panel 11 to the edge of the display panel 11, the center of the display unit 111 may gradually deviate from the center of the corresponding microlens element 121. That is, the distance between the center of the microlens element 121 and the center of the corresponding display unit 111 may gradually increase.

In particular, the distance between the center of the microlens element 121 and the center of the corresponding display unit 111 may gradually increase until the display unit 111 and the microlens elements 121 are separated by a predetermined threshold distance. The threshold distance may be determined in advance based on the display units 111, the microlens elements 121, and/or the image displayed. For example, the maximum distance can be separated may be set such that the image displayed by the display unit 111 may not be able to be refracted by the corresponding microlens element 121. That is, the display unit 111 and the corresponding microlens element 121 are no longer overlapped.

Figure 8:
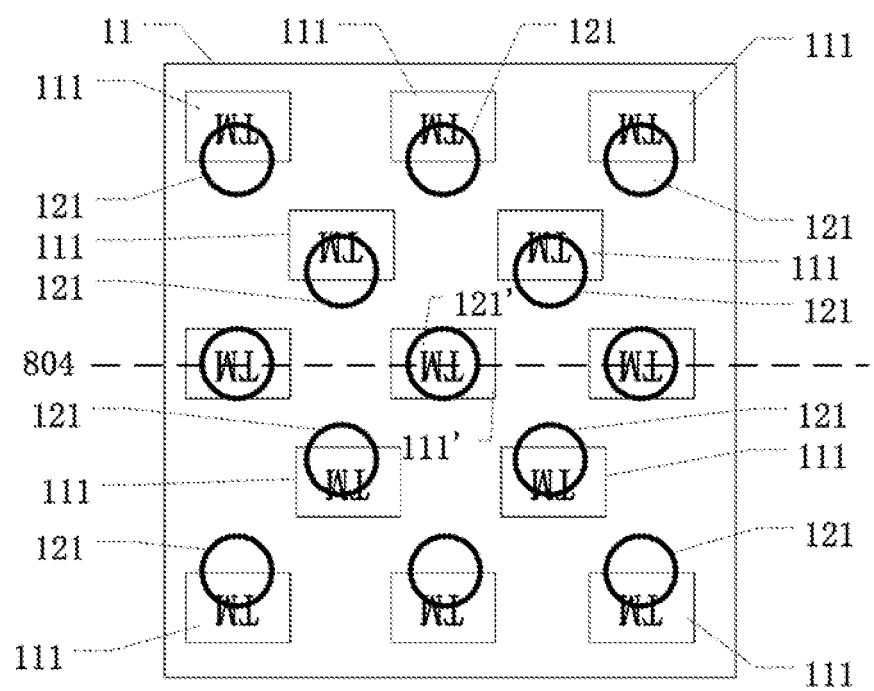
FIG. 8 illustrates a top view of another exemplary display device consistent with disclosed embodiments.

FIG. 8 illustrates a top view of another exemplary display device consistent with disclosed embodiments. As shown in FIG. 8, the display device may include a display panel 11 and a microlens array (not labeled). The display panel 11 may include a plurality of display units 111 displaying an image. For illustrative purposes, each display unit 111 may be set to display a same image "TM" (two letters). The display unit 111 may be any appropriate unit of display for displaying an image or an image element. For example, the display unit 111 may be a pixel or a subpixel of an image, or the display unit 111 may be a block of pixels (e.g., an array of pixels) with a predetermined size for displaying a number of pixels of an image or an image element.

The microlens array including a plurality of microlens elements 121 may be disposed on top of a light emitting surface of the display panel 11. The plurality of microlens elements 121 may be one-to-one corresponding to the plurality of display units 111. Each microlens element 121 may include at least one microlens. The microlens element 121 may be coupled to the corresponding display unit 111 by a bonding means, such as glue, etc.

Further, the plurality of display units 111 may be arranged in multiple rows and multiple columns, and the display units 111 disposed in two adjacent rows may be staggered in the column direction. In the column direction, a center of the display unit 111' disposed along a horizontal center line 804 of the display panel 11 may coincide with a center of the microlens element 121' disposed along the horizontal center line 804 of the display panel 11. That is, for each column of the display units, those display units centered along the horizontal center line 804 are display units 111', and the corresponding microlens element 121' are disposed on the display units 111' with coinciding centers.

Along the center of the display panel 11 to the edge of the display panel 11, the center of the display unit 111 may gradually deviate from the center of the corresponding microlens element 121. That is, the distance between the center of the microlens element 121 and the center of the corresponding display unit 111 may gradually increase.

In particular, the distance between the center of the microlens element 121 and the center of the corresponding display unit 111 may gradually increase until the display unit 111 and the microlens elements 121 are separated by a predetermined threshold distance. The threshold distance may be determined in advance based on the display units 111, the microlens elements 121, and/or the image displayed. For example, the maximum distance can be separated may be set such that the image displayed by the display unit 111 may not be able to be refracted by the corresponding microlens element 121. That is, the display unit 111 and the corresponding microlens element 121 are no longer overlapped.

Figure 9:
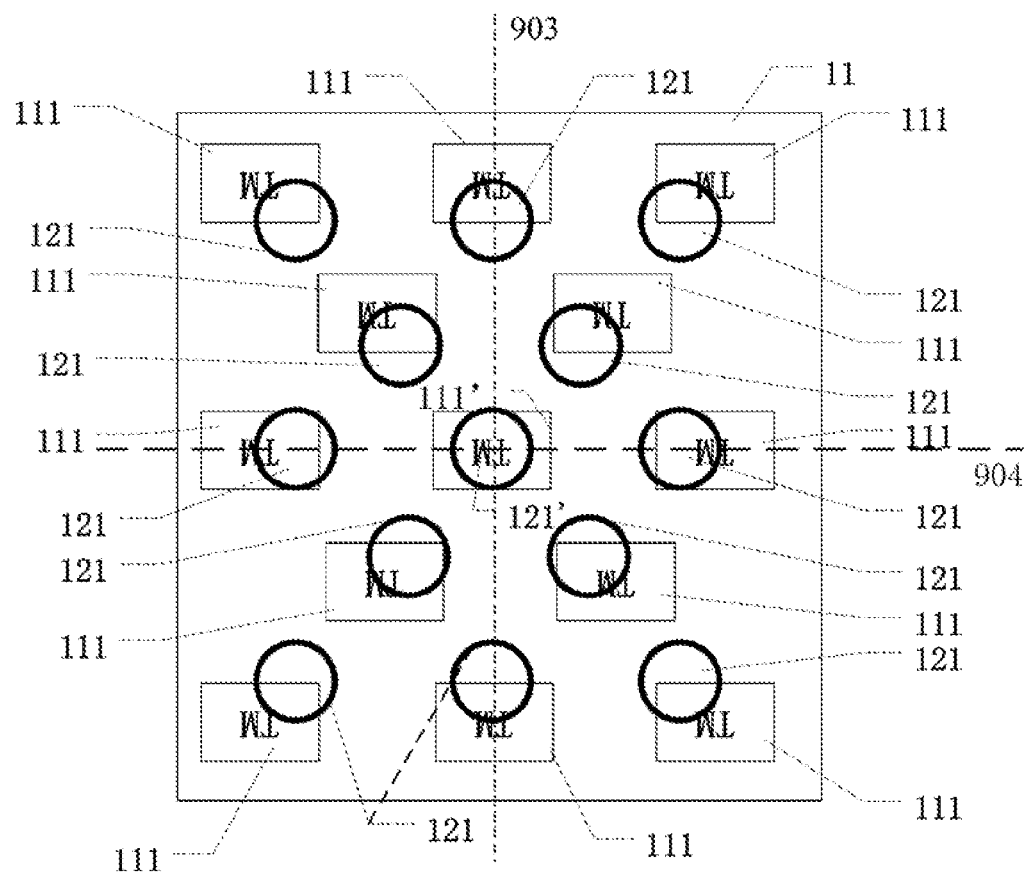
FIG. 9 illustrates a top view of another exemplary display device consistent with disclosed embodiments.

FIG. 9 illustrates a top view of another exemplary display device consistent with disclosed embodiments. As shown in FIG. 9, the display device may include a display panel 11 and a microlens array (not shown in FIG. 9). The display panel 11 may include a plurality of display units 111 displaying a same image. For illustrative purposes, each display unit 111 may be set to display the same image "TM" (two letters). The display unit 111 may be any appropriate unit of display for displaying an image or an image element. For example, the display unit 111 may be a pixel or a subpixel of an image, or the display unit 111 may be a block of pixels (e.g., an array of pixels) with a predetermined size for displaying a number of pixels of an image or an image element.

The microlens array including a plurality of microlens elements 121 may be disposed on top of a light emitting surface of the display panel 11. The plurality of microlens elements 121 may be one-to-one corresponding to the plurality of display units 111. Each microlens element 121 may include at least one microlens. The microlens element 121 may be coupled to the corresponding display unit 111 by a bonding means, such as glue, etc.

Further, the plurality of display units 111 may be arranged in multiple rows and multiple columns, and the display units 111 disposed in two adjacent rows may be staggered in the column direction. In the row direction and the column direction, a center of the display unit 111' disposed at a center (i.e. at a crossing of a vertical center line 903 and a horizontal center line 904) of the display panel 11 may coincide with a center of the microlens element 121' disposed at the center (i.e. the crossing of the vertical center line 903 and the horizontal center line 904) of the display panel 11. That is, the display unit centered at the crossing of the vertical center line 903 and the horizontal center line 904 is the display unit 111', and the corresponding microlens element 121' is disposed on the display unit 111' with an coinciding center Along the center of the display panel 11 to the edge of the display panel 11 and both the row direction and the column direction (e.g., the horizontal direction and the vertical direction), the center of the display unit 111 may gradually deviate from the center of the corresponding microlens element 121. That is, the distance between the center of the microlens element 121 and the center of the corresponding display unit 111 may gradually increase.

In particular, the distance between the center of the microlens element 121 and the center of the corresponding display unit 111 may gradually increase until the display unit 111 and the microlens elements 121 are separated by a predetermined threshold distance. The threshold distance may be determined in advance based on the display units 111, the microlens elements 121, and/or the image displayed. For example, the maximum distance can be separated may be set such that the image displayed by the display unit 111 may not be able to be refracted by the corresponding microlens element 121. That is, the display unit 111 and the corresponding microlens element 121 are no longer overlapped.

As shown in FIGS. 7-9, the display units 111 disposed in two adjacent rows may be staggered in the column direction, which may enable a more uniform distribution of the display units in the display panel. Thus, the uniformity of the floating images may get improved. Further, an image crosstalk causing ghost images, heavy contours, image blurring and etc., may be prevented from affecting the image quality and the visual comfort.

It should be noted that, in FIG. 2, FIG. 4, FIG. 6 and FIGS. 7-9, the display units are disposed in five rows and three columns, which is only for illustrative purposes and is not intended to limit the scope of the present invention. Any number of rows and/or columns may be included.

Figure 10:
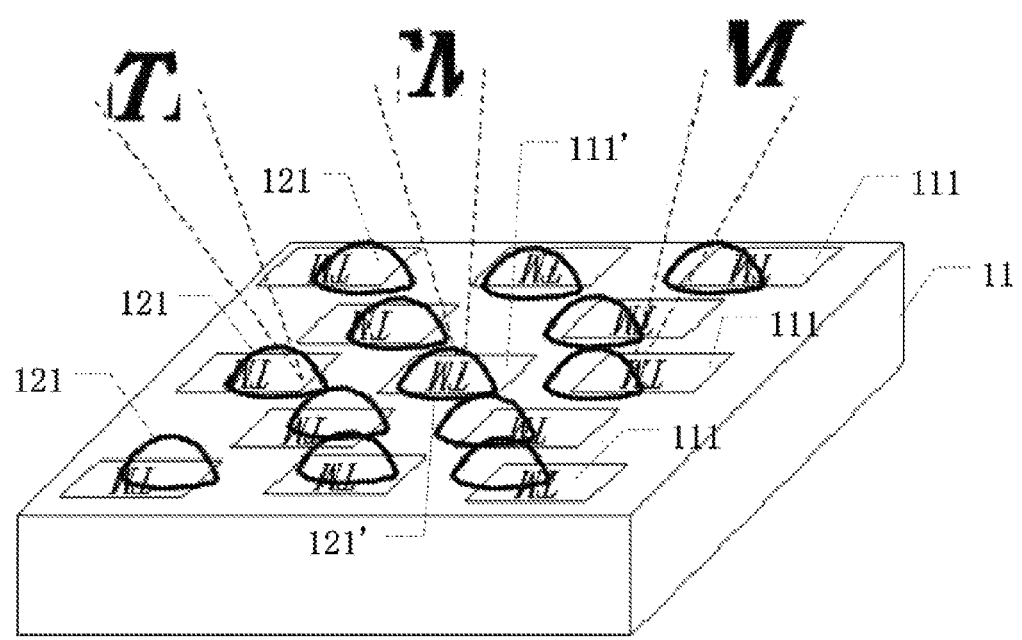
FIG. 10 illustrates a front view of another exemplary display device in FIG. 9 consistent with disclosed embodiments.

FIG. 10 illustrates a front view of another exemplary display device in FIG. 9 consistent with disclosed embodiments. As shown in FIG. 10, each display unit 111 may display a same image of "TM". A dashed line represents a viewing angle, and the viewer may observe the display device from different viewing angles. Because of the refraction of the microlens element 121, the images displayed by different display units 111 may include different portions of the image "TM". Through a microlens array disposed on top of a light emitting surface of a display panel 11, the images displayed by different display units 111 may be fused into one image floating on top of the display panel 11.

Further, in both a row direction and a column direction, from the center of the display panel 11 to the edge of the display panel 11, a distance between the center of the microlens element 121 and the center of the corresponding display unit 111 may gradually increase. Thus, after being refracted by the corresponding microlens elements 121, the images displayed by the display units 111 may show different spatial angles of the image "TM", i.e., the images displayed by the display units 111 may include different portions of the image "TM". The different portions of the image "TM" may enter different viewing zones of the display panel 11. That is, each microlens element 121 may record a partial image displayed by the display unit 111 from a different direction. The images displayed by the display units 111 may be refracted by the corresponding microlens elements 121, and then fused into an image floating in a space, which may look like an image floating in the air.

Figure 11:
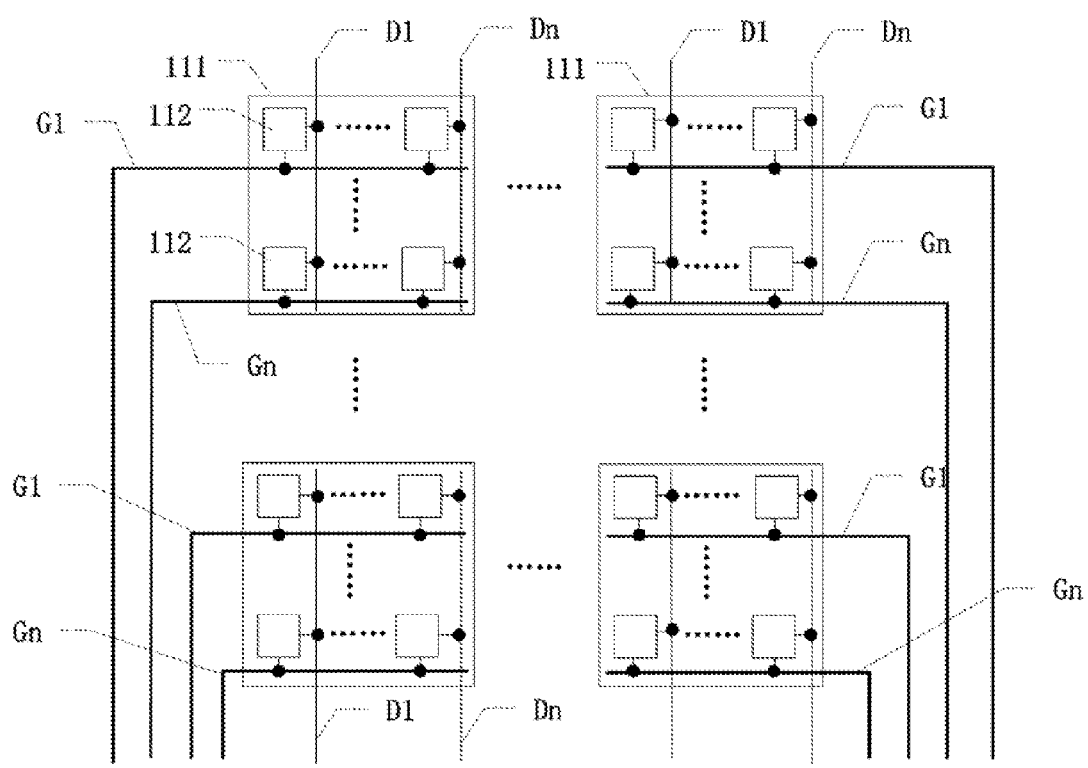
FIG. 11 illustrates a schematic of another exemplary display device consistent with disclosed embodiments.

FIG. 11 illustrates a schematic of another exemplary display device consistent with disclosed embodiments. As shown in FIG. 11, the display device may include a plurality of display units 111, and each display unit 111 may include n number of pixel units 112, where n is a positive integer. The display device may further include a plurality of scanning lines Gn and a plurality of data lines Dn, which may provide scanning signals and data signals to the pixel unit 112 in each of the plurality of display units 111 respectively. Each display unit 111 may have its own scanning lines $G_1$ to Gn and its own data lines $D_1$ to Dn, which may be connected to corresponding interfaces of a display driving chip through wires, respectively.

Figure 12:
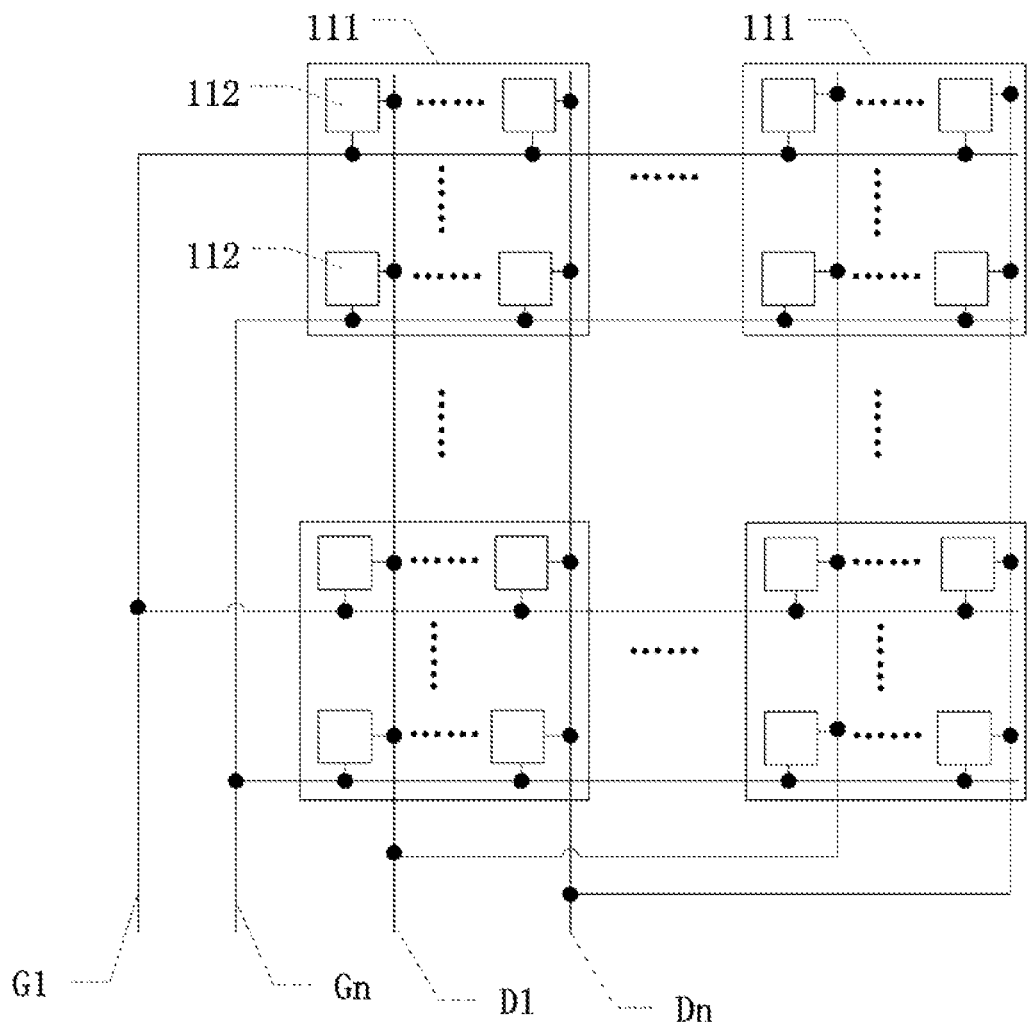
FIG. 12 illustrates a schematic of another exemplary display device consistent with disclosed embodiments.

FIG. 12 illustrates a schematic of another exemplary display device consistent with disclosed embodiments. As shown in FIG. 12, the display device may further include a plurality of scanning lines Gn and a plurality of data lines Dn, which may provide scanning signals and data signals to each pixel unit 112 in a plurality of display units 111 respectively, where n is a positive integer.

The plurality of display units 111 may share the plurality of scanning lines Gn and the plurality of data lines Dn. Because each display unit 111 may display a same image, sharing the plurality of scanning lines Gn and the plurality of data lines Dn among the plurality of display units 111 may reduce the number of interfaces of a display driving chip, the number of the scanning lines and the number of the data lines. Thus, fabrication costs may be reduced accordingly.

Figure 13:
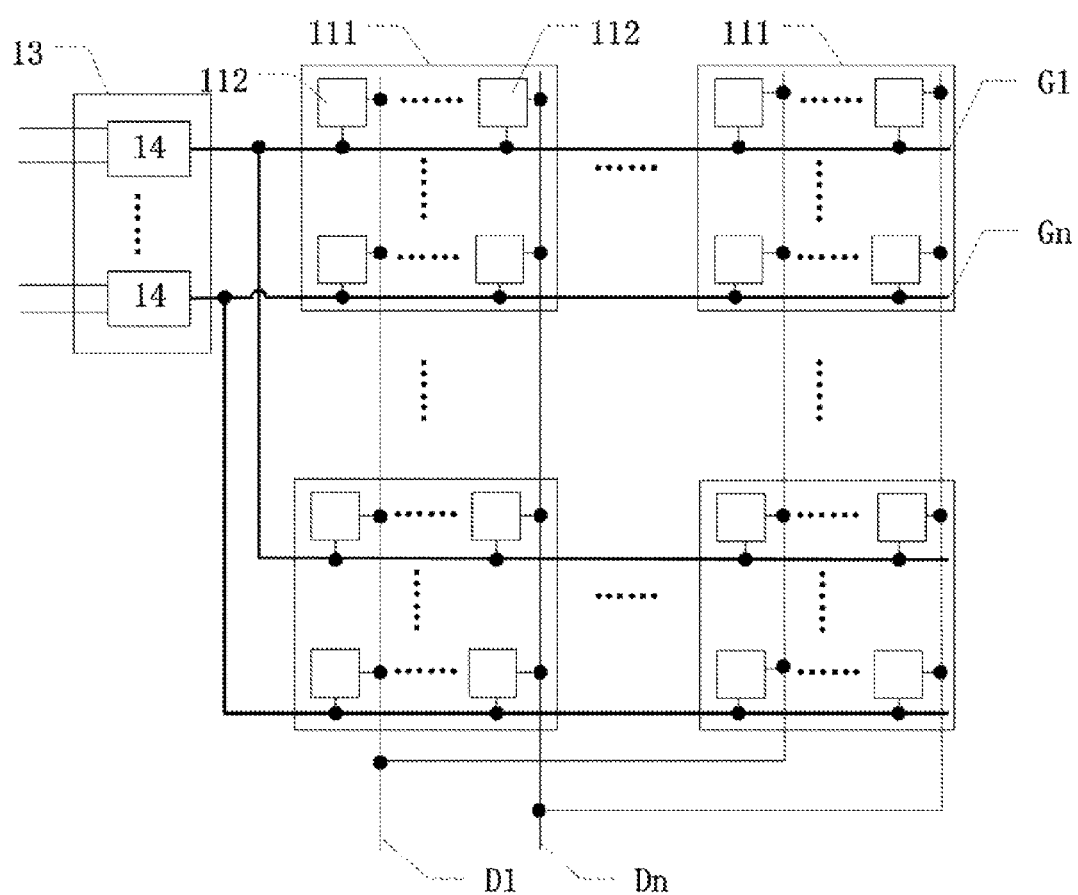
FIG. 13 illustrates a schematic of another exemplary display device consistent with disclosed embodiments.

FIG. 13 illustrates a schematic of another exemplary display device consistent with disclosed embodiment. As shown in FIG. 13, the display device may include a plurality of display units 111, and each display unit 111 may include n number of pixel units 112, where n is a positive integer. The display device may further include a plurality of scanning lines Gn and a plurality of data lines Dn, which may provide scanning signals and data signals to each pixel unit 112 in a plurality of display units 111 respectively. The display device may further include a gate driving circuit 13, which may be disposed in a non-displaying region of a display panel.

The gate driving circuit 13 may include a plurality of cascaded shift registers 14, which may be connected to the corresponding scanning lines Gn, respectively and provide the scanning signal to each pixel unit 112 in the plurality of display units 111 respectively. In the disclosed embodiments, the gate driving circuit 13 capable of driving gates of transistors may be integrated on the display panel and, thus, a cost of a display driving chip may be reduced. The gate driving circuit 13 may be simultaneously formed when fabricating transistors on the display panel.

Figure 14:
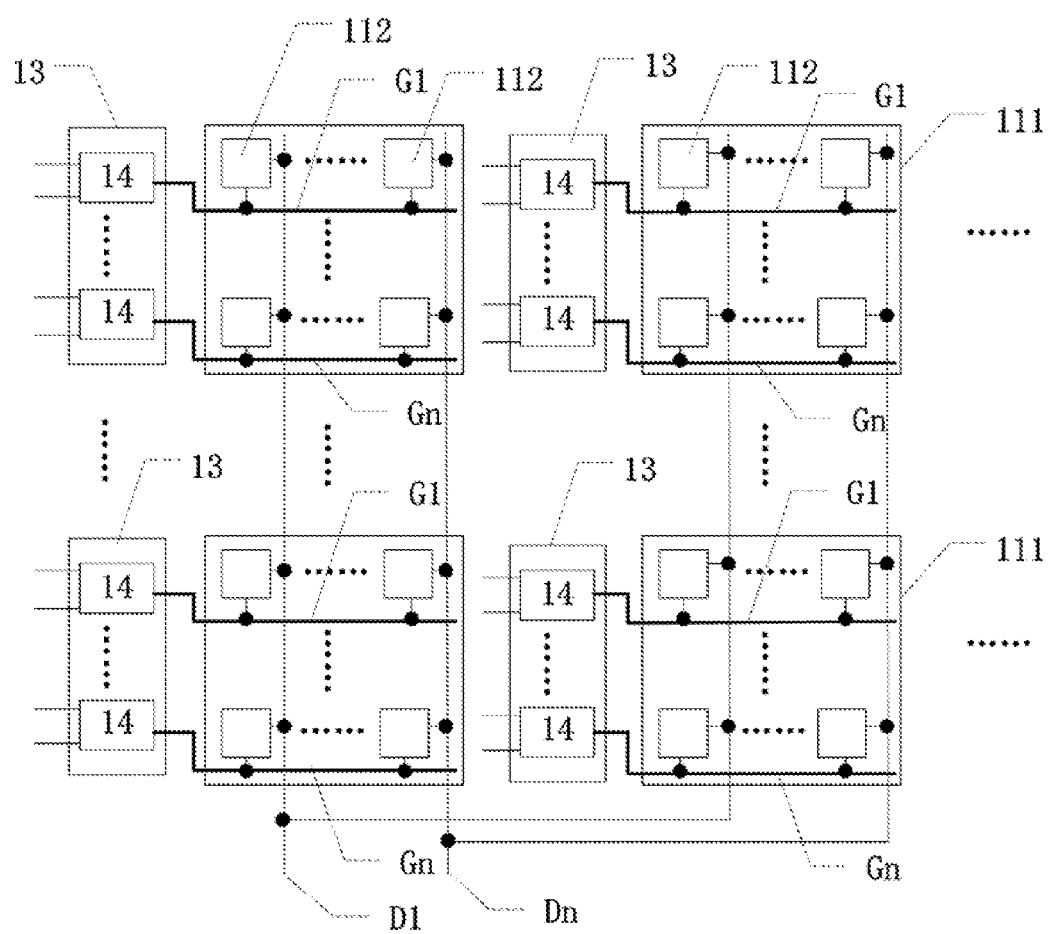
FIG. 14 illustrates a schematic of another exemplary display device consistent with disclosed embodiments.

FIG. 14 illustrates a schematic of another exemplary display device consistent with disclosed embodiments. As shown in FIG. 14, the display device may include a plurality of display units 111, and each display unit 111 may include n number of pixel units 112, where n is a positive integer. The display device may further include a plurality of scanning lines Gn and a plurality of data lines Dn, which may provide scanning signals and data signals to each pixel unit 112 in a plurality of display units 111 respectively. The display device may further include a plurality of gate driving circuit 13, which may be disposed in a non-displaying region of a display panel.

The gate driving circuit 13 may include a plurality of cascaded shift registers 14, which may be connected to the corresponding scanning lines Gn, respectively and provide the scanning signal to each pixel unit 112 in the plurality of display units 111, respectively. If each display unit 111 contains a large number of pixel units 112 while the plurality of display units 111 share the same gate driving circuit 13, a large number of the scanning lines may have to be disposed among the adjacent display units 111 in a same row. Thus, a light transmission area in the display device may shrink.

In the disclosed embodiments, each display unit 111 may be assigned with a corresponding gate driving circuit 13. Thus, a large number of the scanning lines may not have to be disposed among the adjacent display units 111 in the same row, and the light transmission area in the display device may be expanded. It should be noted that, ports in different gate driving circuits 13 which input a same signal may use a same signal line (i.e. a same data line or a same scanning line), which may further reduce the number of the wires in the display device.

It should be noted that, the display panel consistent with disclosed embodiments may be any one of a liquid crystal display panel (LCD), a plasma display panel (PDP), a cathode ray tube (CRT) display panel, an organic light emitting display (OLED) panel and etc. Further, the display unit may have any one of a circular shape, a polygonal shape, an irregular shape and etc. The rectangular-shaped display unit shown in FIGS. 2-14 is only for illustrative purposes, and is not intended to limit the scope of the present invention.

Further, the microlens element may have a hemispherical shape and, thus, the microlens element may transmit a same amount of light in different directions. The viewer may be able to observe a uniform image at different viewing directions and the image crosstalk may be prevented.

The description of the disclosed embodiments is provided to illustrate the present invention to those skilled in the art. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A display device, comprising:
a display panel including a plurality of display units displaying a same image for both eyes of a viewer; and
a microlens array including a plurality of microlens elements disposed on top of a light emitting surface of the display panel,
wherein the plurality of microlens elements are one-to-one corresponding to the plurality of display units, and
a distance between a center of the microlens element and a center of the corresponding display unit gradually increases from a center of the display panel to an edge of the display panel, and
images displayed by the plurality of display units are refracted and integrated through the corresponding microlens elements to be perceived as a 3-dimensional (3D) image by the viewer within a 360-degree coverage of the display device.

2. The display device according to claim 1, wherein:
the plurality of display units are arranged in a matrix; and
the distance between the center of the microlens element and the center of the corresponding display unit gradually increases from the center of the display panel to the edge of the display panel in at least one of a row direction of the matrix and a column direction of the matrix.

3. The display device according to claim 2, wherein:
the plurality of display units are arranged in a matrix; and
the distance between the center of the microlens element and the center of the corresponding display unit gradually increases from the center of the display panel to the edge of the display panel in the row direction of the matrix.

4. The display device according to claim 2, wherein:
the plurality of display units are arranged in a matrix; and
the distance between the center of the microlens element and the center of the corresponding display unit gradually increases from the center of the display panel to the edge of the display panel in the column direction of the matrix.

5. The display device according to claim 2, wherein:
the plurality of display units are arranged in a matrix; and
the distance between the center of the microlens element and the center of the corresponding display unit gradually increases from the center of the display panel to the edge of the display panel in both the row direction of the matrix and the column direction of the matrix.

6. The display device according to claim 1, wherein:
the plurality of display units are arranged in multiple rows and multiple columns;
the display units disposed in two adjacent rows are staggered in a column direction; and
the distance between the center of the microlens element and the center of the corresponding display unit gradually increases from the center of the display panel to the edge of the display panel in at least one of a row direction and the column direction.

7. The display device according to claim 6, wherein:
the plurality of display units are arranged in multiple rows and multiple columns;
the display units disposed in two adjacent rows are staggered in a column direction; and
the distance between the center of the microlens element and the center of the corresponding display unit gradually increases from the center of the display panel to the edge of the display panel in the row direction.

8. The display device according to claim 6, wherein:
the plurality of display units are arranged in multiple rows and multiple columns;
the display units disposed in two adjacent rows are staggered in a column direction; and
the distance between the center of the microlens element and the center of the corresponding display unit gradually increases from the center of the display panel to the edge of the display panel in the column direction.

9. The display device according to claim 6, wherein:
the plurality of display units are arranged in multiple rows and multiple columns;
the display units disposed in two adjacent rows are staggered in a column direction; and
the distance between the center of the microlens element and the center of the corresponding display unit gradually increases from the center of the display panel to the edge of the display panel in both the row direction and the column direction.

10. The display device according to claim 1, further including:
a plurality of scanning lines providing scanning signals to the pixel units in each of the plurality of the display units; and
a plurality of data lines providing data signals to the pixel units in each of the plurality of the display units.

11. The display device according to claim 10, wherein:
each of the plurality of the display units has its own scanning line and its own data line.

12. A display device, comprising:
a display panel including a plurality of display units displaying a same image; and
a microlens array including a plurality of microlens elements disposed on top of a light emitting surface of the display panel;
a plurality of scanning lines providing scanning signals to the pixel units in each of the plurality of the display units; and
a plurality of data lines providing data signals to the pixel units in each of the plurality of the display units,
wherein the plurality of microlens elements are one-to-one corresponding to the plurality of display units, and
a distance between a center of the microlens element and a center of the corresponding display unit gradually increases from a center of the display panel to an edge of the display panel, and
the plurality of the display units share the plurality of scanning lines and the plurality of data lines.

13. The display device according to claim 12, further including:
a gate driving circuit having a plurality of cascaded shift registers disposed on the display panel, wherein the plurality of cascaded shift registers are connected to the corresponding scanning lines respectively and provide the scanning signals to the pixel units in each of the plurality of display units respectively.

14. The display device according to claim 11, further including;
a plurality of gate driving circuits one-to-one corresponding to the plurality of display units, wherein each gate driving circuit includes a plurality of cascaded shift registers connected to the corresponding scanning lines respectively, and the plurality of cascaded shift registers provide the scanning signals to pixel units in each of the plurality of display units respectively.

15. The display device according to claim 1, wherein:
the display panel is one of a liquid crystal display (LCD) panel, a plasma display panel (PDP), a cathode ray tube (CRT) display panel, and an organic light emitting display (OLED) panel.

16. The display device according to claim 1, wherein:
the display unit has one of a circular shape, a polygonal shape and an irregular shape.

17. The display device according to claim 1, wherein:
the microlens element includes at least one microlens.

18. The display device according to claim 17, wherein:
the microlens has a hemispherical shape.

19. The display device according to claim 1, wherein:
the display unit is a unit of display for displaying an image or an image element.

20. The display device according to claim 19, wherein:
the display unit includes at least one pixel unit.

* * * * *